(12) United States Patent
Marchlewski et al.

(10) Patent No.: US 9,630,548 B2
(45) Date of Patent: Apr. 25, 2017

(54) PICK-UP TRUCK BOX AND ACCESSORY INTERFACE SYSTEM

(71) Applicant: Ford Global Technologies, LLC, Dearborn, MI (US)

(72) Inventors: Jack Marchlewski, Saline, MI (US); Eric MacDonald, Windsor (CA); Alana Anne Strager, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 14/568,907

(22) Filed: Dec. 12, 2014

(65) Prior Publication Data

US 2016/0167717 A1 Jun. 16, 2016

(51) Int. Cl.
*B60P 7/08* (2006.01)

(52) U.S. Cl.
CPC .................... *B60P 7/0807* (2013.01)

(58) Field of Classification Search
CPC B60R 13/01; B60R 9/00; B60R 11/06; B60R 13/04; B62D 33/0273; B62D 33/0207; B60P 7/0807; B60P 7/0815; B60P 7/15
USPC ............... 410/106, 110, 112, 144, 101, 142; 280/770; 296/39.2, 37.6, 39.1, 183.1, 41, 296/43
See application file for complete search history.

(56) References Cited

U.S. PATENT DOCUMENTS

| | | | |
|---|---|---|---|
| 3,351,356 A | 11/1967 | Clark et al. | |
| 3,572,755 A | 3/1971 | Baldwin | |
| 4,650,382 A | 3/1987 | Johnson | |
| 4,850,770 A | 7/1989 | Milar, Jr. | |
| 5,419,603 A | 5/1995 | Kremer et al. | |
| 5,443,190 A * | 8/1995 | Cucheran | B60R 9/00 224/309 |
| 5,733,082 A | 3/1998 | Schrader | |
| 5,823,601 A | 10/1998 | Stanesic et al. | |
| RE36,073 E | 2/1999 | Kremer et al. | |
| 5,904,390 A | 5/1999 | Emery et al. | |
| 5,927,787 A | 7/1999 | Emery et al. | |
| 6,039,520 A | 3/2000 | Cheng | |
| 6,106,206 A | 8/2000 | Spier et al. | |
| 6,644,901 B2 | 11/2003 | Breckel | |
| 6,665,911 B1 * | 12/2003 | Huang | B60P 7/0807 24/163 K |
| 6,783,313 B1 | 8/2004 | Huang | |
| 7,001,122 B2 | 2/2006 | Bommarito et al. | |
| 7,080,966 B2 | 7/2006 | Roh | |
| 7,125,194 B2 * | 10/2006 | Vitoorapakorn | B60R 13/01 403/373 |
| 8,833,285 B1 * | 9/2014 | Czipri | B63B 21/04 114/218 |

(Continued)

*Primary Examiner* — Glenn Dayoan
*Assistant Examiner* — Sunsurraye Westbrook
(74) *Attorney, Agent, or Firm* — Jason C. Rogers; Brooks Kushman P.C.

(57) ABSTRACT

An interface system is provided for a truck box. An interface plate is attached to a recess formed in a sidewall of the truck box. A cleat is attached to an inverted T-shaped opening formed in the interface plate. A T-shaped base is inserted in the inverted T-shaped opening to hold the cleat to the sidewall of the truck box. A reinforcement plate is attached to an inside surface of the sidewall.

16 Claims, 4 Drawing Sheets

(56) References Cited

U.S. PATENT DOCUMENTS

| | | | |
|---|---|---|---|
| 8,882,419 B2 * | 11/2014 | Aguirre | B60P 7/0807 410/106 |
| 2003/0034664 A1 | 2/2003 | Wayne | |
| 2008/0080948 A1 | 4/2008 | Tolly et al. | |
| 2008/0152452 A1 * | 6/2008 | Green | B60P 3/075 410/3 |
| 2011/0042990 A1 | 2/2011 | Holt | |
| 2011/0084510 A1 | 4/2011 | Marean | |
| 2013/0257075 A1 * | 10/2013 | Riley | B60R 9/00 296/3 |

* cited by examiner

PICK-UP TRUCK BOX AND ACCESSORY INTERFACE SYSTEM

TECHNICAL FIELD

This disclosure relates to a pick-up truck box and an interface system for securing cargo and accessories to the pick-up truck box.

BACKGROUND

Trucks for transporting cargo are well known and are widely used in business and for recreation. Some truck owners customize the pick-up truck box to provide convenient interface points for tie downs that are used to secure tools, motorcycles, recreation vehicles, containers, or other cargo. Some pick-up truck owners may drill holes in the pick-up truck box or use existing holes or other structural features such as edge flanges or the top end of the bed wall to provide interface points for accessories. Drilling holes in a pick-up truck box increases the extent of corrosion, disrupts the integrity and reduces the strength of the structure. Using existing structural features to secure objects to a pick-up truck box may not meet all of a user's needs and requirements.

Interface accessories for pick-up truck boxes must be securely attached to the pick-up truck box to avoid rattling noises and reassure vehicle users that the attachment is secure. In addition, attachments to pick-up truck boxes are external to the vehicle and may be subject to a risk of theft.

This disclosure is directed to addressing the above problems and other problems as summarized below.

SUMMARY

This disclosure provides a system for interfacing with the box of a truck bed that creates a "platform" for user customization to meet the user's individual needs. The truck box is provided by the original equipment manufacturer as standard equipment. The truck box is internally reinforced by a backing plate that extends around a recessed area formed in the sidewall or floor of the truck bed. An interface plate may be provided as an upgrade that provides several different options for securing cargo to the truck bed.

According to one aspect of this disclosure, an interface system is disclosed for a wall of a truck box. The interface system includes a reinforced side box inner, an interface plate and a cleat assembly. The interface plate is attached to the wall and defines a T-shaped opening having a first portion and a second portion. The cleat assembly includes a cleat, a cleat support and an anchor that is inserted into the first portion of the T-shaped opening and is shifted upwardly into the second portion of the opening. Inserting the cleat support into the first portion of the opening holds the anchor in the second portion.

According to other aspects of this disclosure, the interface plate may have a first flange and a second flange on opposite sides of a central area that is spaced from the wall when the first and second flanges are secured to the wall. The interface system may further comprise a hole defined by the interface plate that is adapted to receive a hook of an attachment strap.

The interface system may further comprise a first tooth provided on the wall that extends into the T-shaped opening from a bottom edge of the opening. A second tooth provided on the wall extends into the T-shaped opening from a bottom edge of the opening. The first and second teeth may be spaced apart to receive an E-track fitting between the first and second teeth.

The interface system may further comprise a lock attached to the cleat support that engages the interface plate when the system is locked and disengages the interface plate when the system is unlocked for insertion and removal of the cleat assembly.

The cleat support may include an attachment portion that is adapted to be attached to the cleat assembly between the cleat and the anchor. The cleat support is adapted to be inserted in the first portion of the T-shaped opening when the cleat is disposed in the second portion of the T-shaped opening. The cleat support may have a body portion that is configured to fit within the first portion of the T-shaped opening.

According to another aspect of this disclosure, an interface system is disclosed for a truck box comprising a wall defining a recessed pocket in a Class A surface of the truck box. An interface plate is attached within the recessed pocket. The interface plate defines an inverted T-shaped opening including an upper edge and a lower edge that are spaced from the wall. The upper edge and lower edge of the T-shaped opening are adapted to receive an attachment including an E-track fitting.

According to another aspect of this disclosure, first and second teeth may be provided on the wall that extends into the inverted T-shaped opening from a bottom edge of the opening. The first and second teeth are spaced apart to receive the E-track fitting between the first and second teeth.

According to another aspect of this disclosure, a faceplate for a wall of a truck bed is disclosed that comprises a first flange and a second flange on opposite sides of a central area that is spaced from the wall with the first and second flanges being secured to the wall. The central area defines an inverted T-shaped opening including a lower portion having a width L, and an upper portion with a width U that is less than width L.

According to other aspects of this disclosure, the face plate may be used in combination with a cleat assembly. The cleat assembly may further comprise a cleat, a cleat support, and an anchor that is inserted into the lower portion and shifted upwardly into the upper portion. The cleat support is inserted into the lower portion to hold the anchor in the upper portion.

According to another aspect of this disclosure as it relates to a truck bed, a wall is disclosed that includes a planar recessed portion disposed parallel to the wall. A faceplate defines an opening that is attached to the recessed portion to define a lip. A cleat having an anchoring portion is received in the opening and is detachably locked to the lip inside the opening.

The above aspects of the disclosure and other aspects will be better understood in view of the attached drawings and the following detailed description of the illustrated embodiments.

DETAILED DESCRIPTION

A detailed description is provided below of the illustrated embodiments of the present disclosure. The disclosed embodiments are examples of the invention that may be embodied in various and alternative forms. The figures are not necessarily to scale. Some features may be exaggerated or minimized to show details of particular components. The specific structural and functional details disclosed are not to be interpreted as limiting, but merely as a representative basis for teaching one skilled in the art how to use the disclosed concepts.

Figure 1:
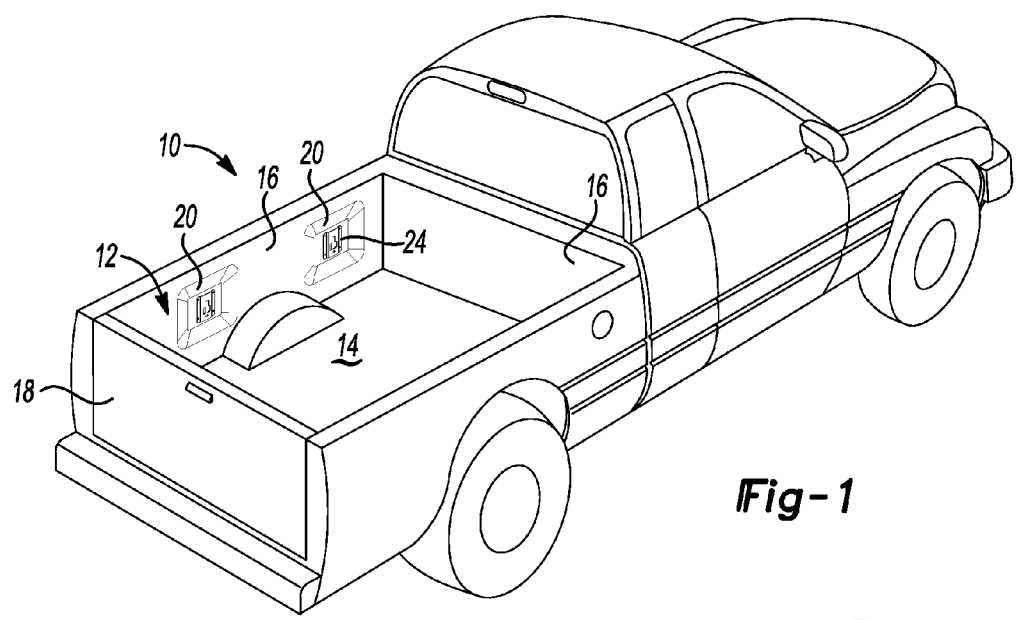
FIG. 1 is a perspective view of a pick-up truck showing the truck box with the disclosed interface system.

Referring to FIG. 1, a pick-up truck 10 that includes a truck box 12 is illustrated. The truck box 12 includes a truck bed 14 and sidewalls 16 that extend about three sides of the truck bed 14. The tailgate 18 of the pick-up truck 10 may also function as a sidewall on a fourth side of the truck bed 14.

A plurality of recesses 20 are shown in the sidewalls 16 of the truck box 12. The recesses 20 provide added strength for supporting objects connected to the sidewall 16. The recesses 20 are offset into the sidewall 16 to reduce the extent that an attachment extends into the truck bed area. The recesses each include a planar recessed portion that is disposed in a generally parallel orientation relative to the wall. An interface plate 24 is shown in each of the recesses 20 and is described in greater detail below.

Figure 3:
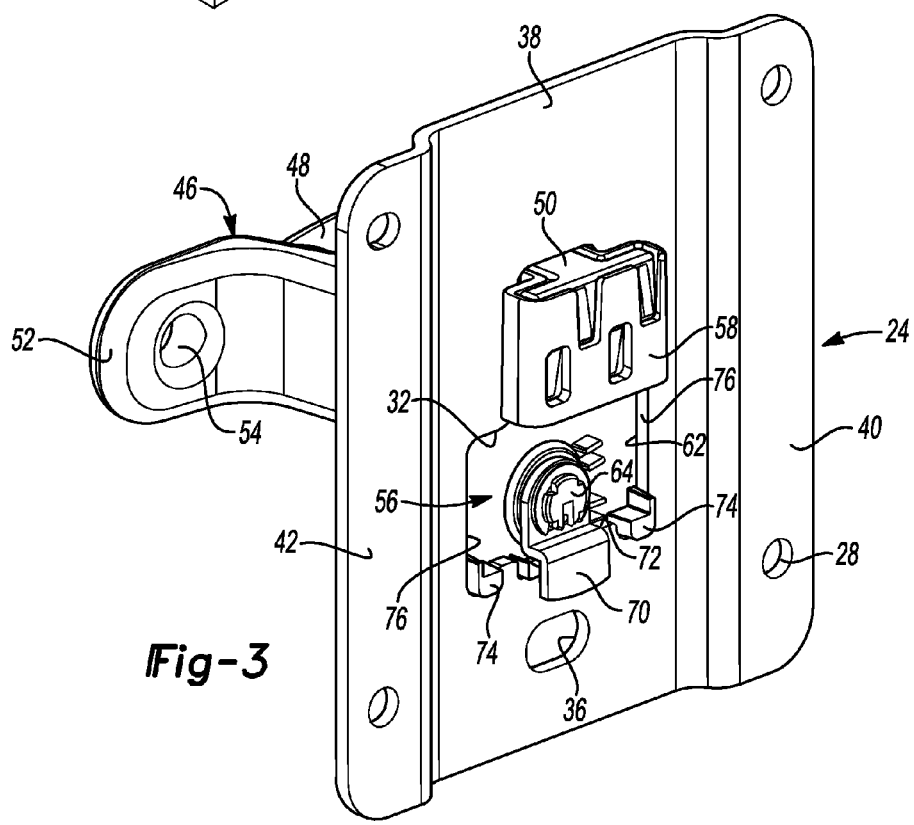
FIG. 3 is a rear/side perspective view of an interface plate, the cleat and the support plug.
Figure 2:
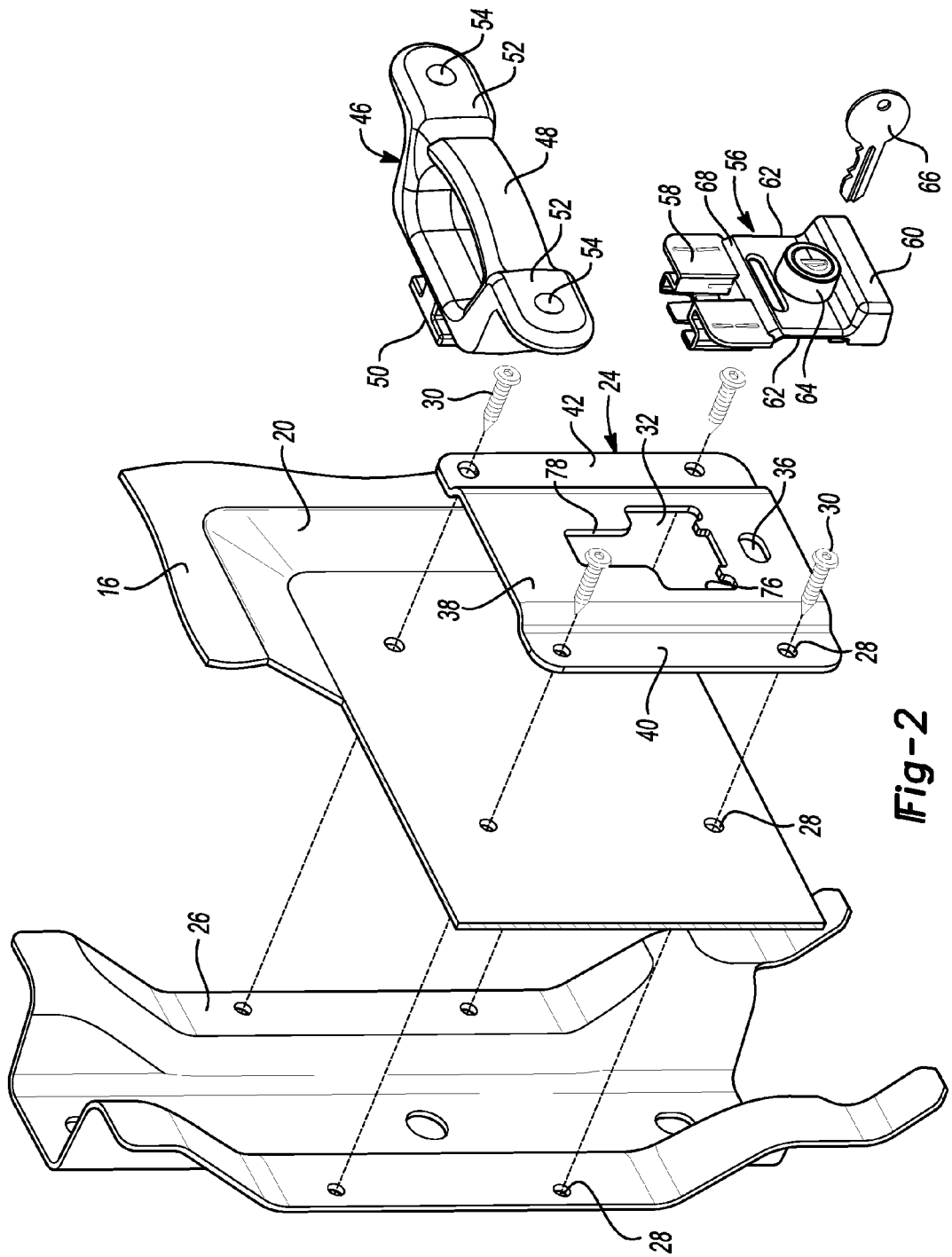
FIG. 2 is a fragmentary exploded perspective view of a recess in the truck bed wall, a reinforcement panel, a cover plate, a cleat and a support plug.

Referring to FIGS. 2 and 3, the interface plate 24 is illustrated that is adapted to be attached to the wall 16 within a recess 20. A reinforcement plate 26 is attached to the opposite side of the wall 16 from the interface plate 24. A plurality of holes 28 are drilled through the interface plate 24, sidewall 16 and reinforcement plate 26. A plurality of fasteners 30 are inserted into the holes 28 to hold the interface plate 24 to the sidewall 16 and reinforcement plate 26.

The interface plate 24 includes an inverted T-shaped opening 32 and a hook receiving opening 36 in a central area 38 of the interface plate 24. The interface plate, or faceplate, defines an opening that is attached to the recessed portion to define a lip. The lip is formed by the edges of the inverted T-shaped opening 32 as will be described more specifically below.

A first flange 40 and second flange 42 of the interface plate 24 flank the central area 38. The first flange 40 and second flange 42 are secured by the fasteners 30 against the sidewalls 16. The central area 38 is spaced from the sidewall 16 to provide clearance behind the inverted T-shaped opening 32 and the hook receiving opening 36.

A cleat 46 that is similar in structure to a cleat used in marine applications includes a handle 48 and a T-shaped base 50, or anchoring portion. The cleat 46 includes two arms 52 that extend outwardly from the handle 48. Holes 54 are provided in each of the arms 52. The holes 54 may be used to secure a rope or hook to the arms 52 of the cleat 46. The anchoring portion 50 of the cleat is received in the inverted T-shaped opening 32. The cleat 46 is detachably locked to the edges of the opening 32.

A cleat support 56 may be formed of plastic and includes a T-shaped base receiver 58 that is adapted to receive the T-shaped base 50 of the cleat 46. The T-shaped base receiver 58 includes a finger grip 60 that is adapted to receive the fingers of a person in the course of installing the cleat 46 into the inverted T-shaped opening 32. The cleat support 56 includes sidewalls or side edges 62 that are adapted to engage the sides of the inverted T-shaped opening 32.

A lock cylinder 64 may be assembled to the cleat support 56. A key 66 may be used to lock and unlock the lock cylinder 64.

A living hinge 68, or flexible portion of the cleat support 56, is provided between the T-shaped base receiver 58 and the grip 60. The living hinge 68 permits the cleat support 56 to be bent to facilitate insertion of the T-shaped base 50 and T-shaped base receiver 58 into the inverted T-shaped opening 32.

A lock arm 70 is rotated by the lock cylinder 64 between the locked position as shown in FIG. 3 and an unlocked position in which the lock arm 70 is rotated 90°. The lock arm 70 is rotated behind a bottom edge 72 of the inverted T-shaped opening 32 to lock the cleat support 56 within the inverted T-shaped opening 32. A corner post 74 is provided on the cleat support 56 at opposite ends of the bottom edge 72 where the bottom edge 72 terminates at two lower side edges 76 of the inverted T-shaped opening 32. Upper side edges 78 of the inverted T-shaped opening 32 are located above the lower side edges 76. The space between the upper side edges 78 is less than the spacing between the lower side edges 76. The T-shaped base 50 is inserted between the lower side edges 76 and slides upwardly until it is received between the upper side edges 78 that retain the T-shaped base 50 on the interface plate 24.

Figure 4:
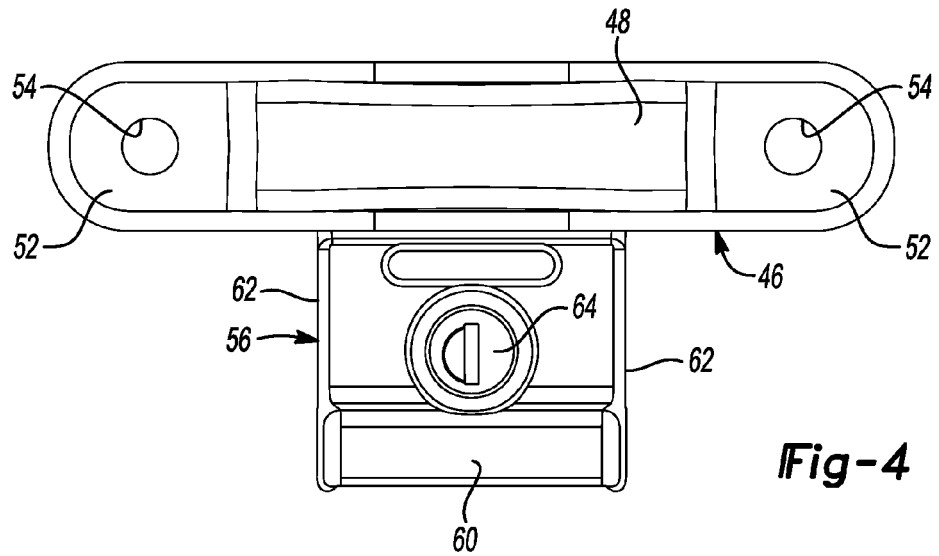
FIG. 4 is a side elevation view of the cleat and support plug.

Referring to FIG. 4, the cleat 46 and cleat support 56 are shown in isolation. The cleat 46 includes the handle 48 and the arms 52 that define the holes 54. A hook or rope may be secured to the arms 52 using the holes 54. The cleat support 56 includes the handle 60 on the end of the cleat support 56 opposite the cleat 46. Sidewalls 62 are adapted to be received within the lower side edges 76 of the inverted T-shaped opening 32 (as shown in FIGS. 2 and 3). The locking cylinder 64 is shown assembled to the cleat support 56 above the hand grip 60 and between the sidewalls 62.

Figure 5:
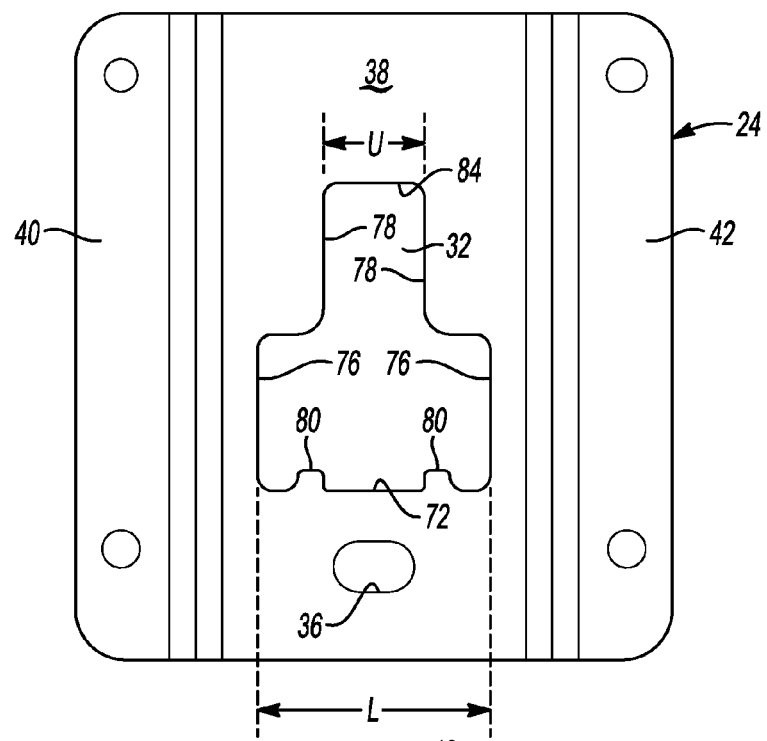
FIG. 5 is a side elevation view of the interface plate.

Referring to FIG. 5, the inverted T-shaped opening 32 is shown to include lower side edges 76 that are spaced apart by a width "L" and more closely spaced upper side edges 78 that are spaced apart by a width "U". E-track fitting teeth 80 are provided on the bottom edge 72 of the inverted T-shaped opening 32. The hook received in the opening 36 is defined by the central area 38 below the inverted T-shaped opening 32.

The inverted T-shaped opening is defined by the bottom edge 72, lower side edges 76, upper side edges 78 and an upper edge 84. E-track fitting teeth 80 are provided on the bottom edge 72 to facilitate aligning an E-track fitting 82 (shown and described with reference to FIG. 8) into the inverted T-shaped opening 32.

Figure 6:
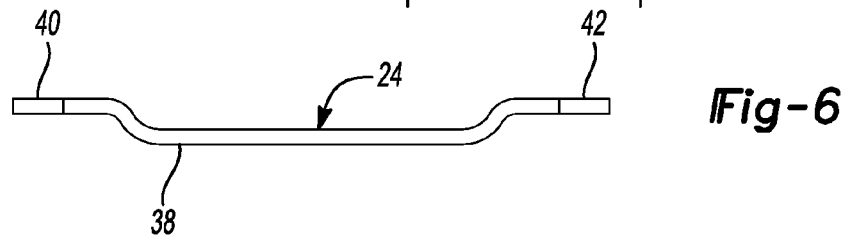
FIG. 6 is a top plan view of the interface plate.

Referring to FIGS. 5 and 6, the interface plate 24 is shown to include the first flange 40 and second flange 42 on opposite sides of the central area 38.

Figure 7:
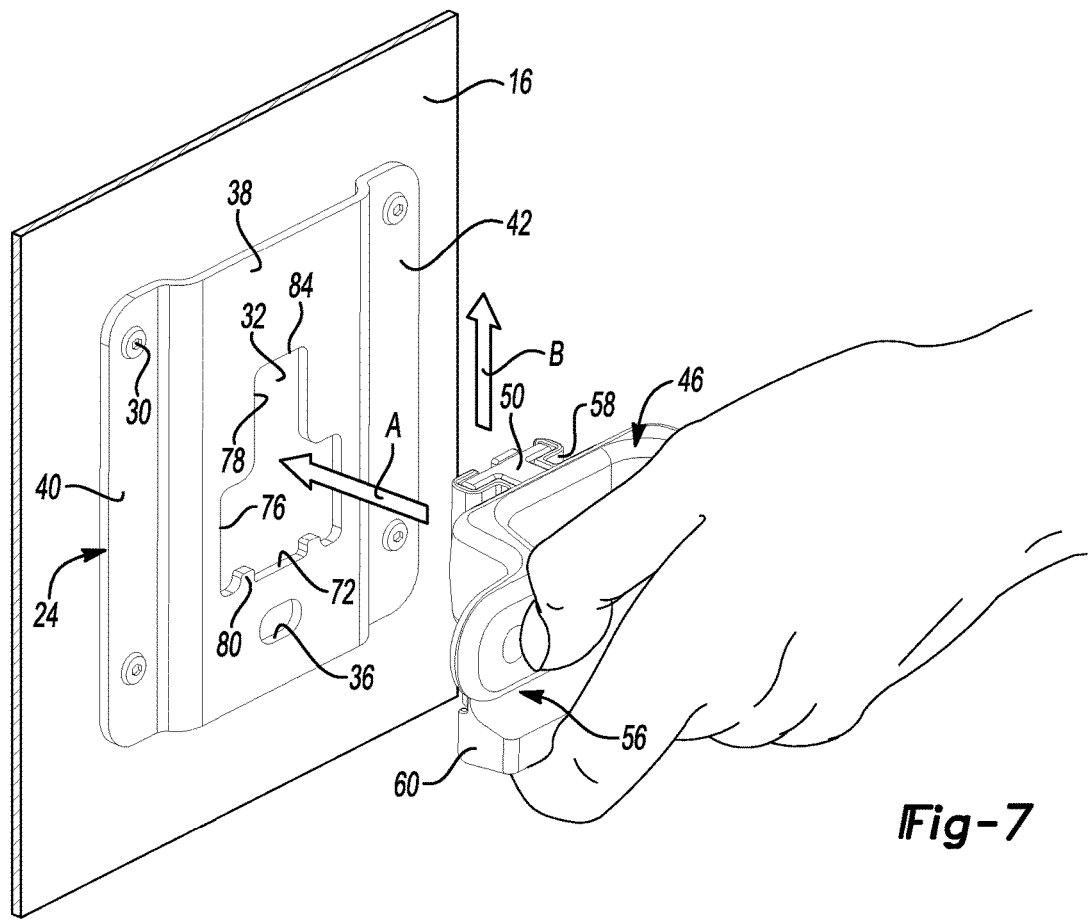
FIG. 7 is a perspective view of a cleat and cleat support assembled to the interface plate on the sidewall of the pick-up truck bed.

Referring to FIG. 7, the cleat 46 is shown in position to be inserted into the inverted T-shaped opening 32 in the interface plate 24. The plate 24 includes first and second flanges 40 that are secured to the sidewall 16 by fasteners 30. The hook receiving opening 36 is defined in the central area 38 of the interface plate 24. The T-shaped base 50 is assembled within the T-shaped base receiver 58. The T-shaped base receiver 58 is a plastic piece that may be heat staked to the T-shaped base 50 to permanently secure the T-shaped base receiver 58 to the T-shaped base 50. A person inserting the cleat 46 may grasp the grip 60 formed on the cleat support 56 and bend the cleat support 56 so that it is flexed to facilitate insertion of the T-shaped base 50 into the inverted T-shaped opening 32. The T-shaped base 50 is inserted, as indicated by arrow "A", into the inverted T-shaped opening 32 and then slides in a direction indicated by arrow "B" to move the T-shaped base 50 from a position between lower side edges 76 to a position between the upper side edges 78.

Figure 8:
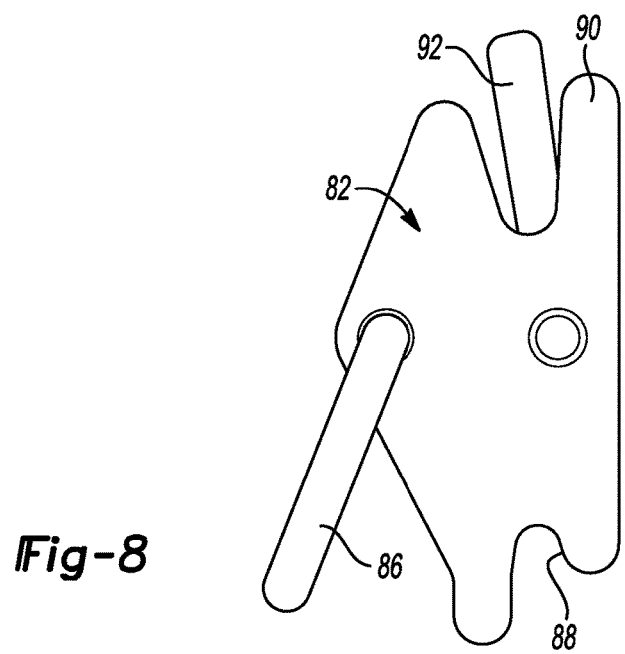
FIG. 8 is a side elevation view of an E-track fitting.

Referring to FIGS. 7 and 8, one example of an E-track fitting is generally indicated by reference numeral 82. Many different varieties of E-track fittings 82 are available and any such fittings may be received in the inverted T-shaped opening 32 in a generally vertical orientation. The E-track fitting 82 may be assembled into the T-shaped opening 32, as shown in FIG. 7. The E-track fitting 82 includes an attachment ring 86 that may engaged by a hook or may receive a rope. A lower hook 88 of the E-track fitting 82 is assembled between the E-track fitting teeth 80 on the bottom edge 72 of the inverted T-shaped opening 32, as shown in FIG. 7. An upper hook 90 is received below the upper edge 84 of the inverted T-shaped opening 32 and is held in place by a latch finger 92 in a manner that is well known in connection with E-track fittings.

The disclosure and drawings of Applicant's co-pending patent application Ser. No. 13/564,158 filed on Aug. 1, 2012 are incorporated by reference in their entirety. The disclosure of attaching accessories, such as containers or clips, is specifically incorporated by reference.

While exemplary embodiments are described above, it is not intended that these embodiments describe all possible forms of this disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An interface system for a truck box wall comprising:
 a faceplate attached to the wall that defines a T-shaped opening having a first portion and a second portion; and
 a cleat assembly including a cleat attached to an anchor, a cleat support defining a receiver, the anchor is inserted into the receiver and the cleat assembly is inserted into the first portion and slides into the second portion to hold the anchor in the receiver.

2. The interface system of claim 1 wherein the face plate has a first flange and a second flange on opposite sides of a central area that is spaced from the wall with the first and second flanges being secured to the wall.

3. The interface system of claim 1 wherein the face plate defines a hole that is adapted to receive a hook of an attachment strap.

4. The interface system of claim 1 further comprising a first tooth provided on the faceplate that extends into the T-shaped opening from a bottom edge of the opening, and a second tooth provided on the faceplate that extends into the T-shaped opening from a bottom edge of the opening, wherein the first and second teeth are spaced apart to receive an E-track fitting between the first and second teeth.

5. The interface system of claim 1 further comprising a lock attached to the cleat support, wherein the lock has a lock tab that pivots to sandwich the receiver between the lock tab and the faceplate when the system is locked and pivots to disengage the faceplate when the system is unlocked for insertion and removal of the cleat assembly.

6. The interface system of claim 1 wherein the receiver defined by the cleat support has a T-shaped opening that receives the anchor.

7. The interface system of claim 1 wherein the cleat support includes a planar rectangular shaped portion that is adapted to be inserted in the first portion of the T-shaped opening when the cleat is disposed in the second portion of the T-shaped opening.

8. The interface system of claim 1 wherein the cleat support is configured to fit within the first portion of the T-shaped opening to hold the cleat in the second portion of the T-shaped opening.

9. The interface system of claim 8 further comprising at least one corner post engaging lower side edges of the T-shaped opening adjacent a bottom edge of the T-shaped opening.

10. An interface system for a truck box comprising:
 a wall defining a recessed pocket in a Class A surface of the truck box;
 a faceplate attached within the recessed pocket having a central portion spaced from the wall defining an inverted T-shaped opening defining an upper rectangular upper portion defining an upper edge and a rectangular lower portion defining a lower edge and having a width less than a width defined by the rectangular upper portion; and
 an attachment including an E-track fitting anchor that is assembled to the upper edge defined by the rectangular-upper portion and the lower edge defined by the rect-angular-lower portion.

11. The interface system of claim 10 further comprising a first tooth provided on the faceplate that extends into the inverted T-shaped opening from a bottom edge of the opening, and a second tooth provided on the faceplate that extends into the inverted T-shaped opening from the lower edge of the opening, wherein the first and second teeth are spaced apart to receive the E-track fitting anchor between the first and second teeth.

12. The interface system of claim 10 wherein the faceplate has a first flange and a second flange on opposite sides of a central area that is spaced from the wall with the first and second flanges being secured to the wall.

13. The interface system of claim 10 wherein the faceplate defines a hole that is adapted to receive a hook of an attachment strap.

14. A faceplate for a wall of a truck bed comprising;
 a first flange and a second flange on opposite sides of a central area that is spaced from the wall with the first and second flanges being secured to the wall;
 the central area defining an inverted T-shaped opening including a lower-rectangular portion having a width L and an upper-rectangular portion with a width U that is less than width L; and
 a first tooth provided on the central area of the faceplate that extends into the inverted T-shaped opening from a bottom edge of the opening, and a second tooth provided on the central area of the faceplate that extends into the inverted T-shaped opening from a bottom edge of the opening, wherein the first and second teeth are spaced apart to receive an E-track fitting between the first and second teeth.

15. The faceplate of claim 14 in combination with a cleat assembly, the cleat assembly further comprising:
 a cleat;

a cleat support; and an anchor inserted into the lower portion and shifted upwardly into the upper portion, wherein the cleat support is inserted into the lower portion to hold the anchor in the upper portion.

16. A truck bed comprising:

a wall including a planar recessed portion disposed parallel to the wall;

a lock having a locking tab;

a face-plate defining an opening that is attached to the recessed portion to define a lip; and a cleat having an anchoring portion that is received in the opening and is detachably locked by pivoting the locking tab to a position between the lip and the wall.

* * * * *